United States Patent [19]

Wang

[11] Patent Number: 4,921,931
[45] Date of Patent: May 1, 1990

[54] THERMOSETTING RESIN COMPOSITIONS
[75] Inventor: Pen C. Wang, Houston, Tex.
[73] Assignee: Shell Oil Company, Houston, Tex.
[21] Appl. No.: 324,866
[22] Filed: Mar. 17, 1989
[51] Int. Cl.$^5$ .............................................. C08G 73/10
[52] U.S. Cl. .................................. 528/322; 526/259; 526/262; 526/264; 528/323
[58] Field of Search ...................... 526/259, 262, 264; 528/322, 323

[56] References Cited
U.S. PATENT DOCUMENTS 4,540,713 9/1985 Kirchhoff ............................ 526/281
4,675,370 6/1987 Tan et al. ............................ 526/259
4,687,815 8/1987 Wong ................................... 525/271

Primary Examiner—Harold D. Anderson
Assistant Examiner—T. Mosley

[57] ABSTRACT

Novel thermosetting resin compositions comprise a mixture of a 1,6-diaza [4.4] spirodilactam having an arylcyclobutenealkyloxyaryl substituent on each spiro ring nitrogen atom and at least one other polymerizable monomer having at least two functional groups with multiple bonds between adjacent atoms. The cured compositions obtained by heating the resin compositions have relatively high glass transition temperatures and good physical properties.

25 Claims, No Drawings

THERMOSETTING RESIN COMPOSITIONS

FIELD OF THE INVENTION

The invention relates to novel thermosetting resin compositions and to cured products obtained by the heating thereof. More particularly, the invention relates to themosetting resin compositions comprising (1) an arylcyclobutenealkyl ether of a 1,6-diaza[4.4]spirodilactam having a hydroxyaryl substituent on each spiro ring nitrogen atom and (2) at least one additional polymerizable monomer having at least two functional groups with multiple bonds between adjacent atoms.

BACKGROUND OF THE INVENTION

The curing of monomeric materials to produce thermoset resins is well known in the art. In general, the polymerizable monomers have at least one and customarily more than one reacting group which serves as a site for the curing or crosslinking polymerization to produce the cured products which are typically highly crosslinked and insoluble solids. There are some polymerizable monomeric materials wherein the active sites are such that the monomer will cure on application of energy, e.g., heat or high intensity UV light. In many if not most cases, however, a curing agent is necessary to allow the crosslinking reaction to proceed at an acceptable rate. The curing agents are catalytic or are stoichiometric relative to the resin to be crosslinked. The stoichiometric curing agents, i.e., agents which are employed in substantial quantity relative to the quantity of the resin, are the more commonly used and are typically multi-functional polymerizable compounds having a plurality of reactive groups capable of participating in crosslinking reactions. A mixture of the resin and a curing agent, generally referred to as a thermosetting resin composition, is then cured by application of heat, with or without the presence of an accelerator which may be added to obtain a more acceptable rate.

Thermoset resins containing arylcyclobutene moieties, especially benzocyclobutene moieties, are known in the art. A series of U.S. patents to Kirchhoff, of which U.S. No. 4,540,763 is illustrative, describes the production and curing of a large number of benzocyclobutene derivatives wherein the benzocyclobutene moieties are connected by linking groups attached directly to a carbon atom of the six-membered ring. A U.S. patent to Tan et al., U.S. No. 4,675,370, describes benzocyclobutene derivatives in which the six-membered ring of the benzocyclobutene ring is attached to a substituent having an acetylenic group. A related patent series of Wong, of which 4,687,815 is illustrative, discloses alkenyl-substituted benzocyclobutene derivatives. A Research Disclosure, source unknown, discloses benzocyclobutenes in which the six-membered ring is attached to a polyvalent organic or inorganic group which is preferably hydrocarbon or contains silicon, nitrogen or oxygen heterocyclic moieties. A somewhat different type of benzocyclobutene ether derivative is disclosed and claimed in copending U.S. patent appplication Ser. No. 349,546, filed May 9, 1989, directed to benzocyclobutenealkyl ethers of bis(hydroxyphenyl)alkanes. These ethers have an alkylene group attached to the six-membered ring of the benzocyclobutene ring system and through the ether oxygen is attached to the phenyl group of the bis(hydroxyphenyl)alkane. Benzocyclobutenealkyl ethers of a 1,6-diaza[4,4]spirodilactam having hydroxyaryl-containing substituents on the spiro ring nitrogen atoms are within the scope of copending U.S. patent application Ser. No. 324,872, filed Mar. 17, 1989. Other ethers of this spirodilactam are disclosed in copending U.S. patent application Ser. No. 245,433, filed Sept. 16, 1988 now U.S. Pat. No. 4,847,388. Alkenyl and alkynyl ethers, e.g., allyl or propargyl ethers, of 1,6-di(4-hydroxyphenyl)-1,6-diazaspiro[4.4]nonane-2,7-dione are illustrative and are disclosed as being curable.

It would be of advantage, however, to provide novel thermosetting resin compositions wherein a multiplicity of differing cyclic structures are present.

SUMMARY OF THE INVENTION

This invention provides novel thermosetting resin compositions comprising arylcyclobutenealkyl ether compounds and at least one additional polymerizable monomer of different chemical structure, as well as the cured products of heating the thermosetting resin compositions. More particularly, the invention relates to thermosetting resin compositions comprising (1) arylcyclobutenealkyl ethers of hydroxyaryl-substituted 1,6-diaza[4.4]spirodilactams wherein the hydroxyaryl substituents are located on the spiro ring nitrogen atoms and (2) at least one additional polymerizable monomer having at least two functional groups having multiple bonds between adjacent atoms.

DESCRIPTION OF THE INVENTION

The thermosetting resin compositions of the invention comprise an arylcyclobutenealkyl ether of certain hydroxyaryl-substituted spirodilactams and at least one additional monomer. The ether components of the compositions of the invention are ethers of a 1,6-diazaspiro[4.4]nonane-2,7-dione compound having an hydroxyaryl-containing substituent on each spiro ring nitrogen atom, wherein the ethers are illustratively formed by replacement of the acid hydrogen of the hydroxyaryl substituents with arylcyclobutenealkyl moieties derived from an alkylarylcyclobutene compound in which the remaining valence of the alkyl moiety is satisfied by being chemically bound to an electron-withdrawing group. Such ethers are conveniently formed by reaction of the electron-withdrawing group-substituted alkylarylcyclobutene reactant with a salt, particularly an alkali metal salt of the hydroxyaryl-substituted spirodilactam.

The arylcyclobutene reactant is a compound of the formula

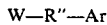

$$W-R''-Ar \qquad (I)$$

wherein Ar represents an aromatic ring system of up to 4 aromatic rings and up to 30 carbon atoms inclusive, which contains at least one cyclobutene ring fused to an aromatic ring and which is substituted by W—R″— on a carbon atom of a six-membered ring, R″ is alkylene of up to 10 carbon atoms, inclusive, and W is an electron-withdrawing group. Suitable aromatic ring systems are illustrated by the single aromatic ring compound benzene, the fused ring system compounds naphthalene, anthracene and phenanthrene, the directly joined aromatic ring system compounds biphenyl and 1-phenylnaphthalene and the indirectly-joined ring system compounds of twoor more aromatic rings joined by an alkylene group, e.g., diphenylalkanes such as diphenylmethane and 2,2-diphenylpropane. The preferred aromatic ring system is a single aromatic ring and the preferred arylcyclobutene moiety is a benzocyclobutene. The arylcyclobutene is otherwise unsubstituted except for the W—R″— group or is substituted on ring carbon atoms with groups such as cyano or lower alkyl, i.e., alkyl of up to 4 carbon atoms inclusive such as methyl or ethyl, which groups are inert under the conditions at which production of the ether composition components takes place. The preferred arylcyclobutene moieties are unsubstituted except for the W—R″— group.

The term W in the above formula I is an electron-withdrawing group, by which is meant a substituent which more easily than hydrogen withdraws or attracts electrons from other positions within the molecule or alternatively expressed is a readily "leaving" or "departing" group in electrophillic substitution reactions. Illustrative of such groups are cyano, halo, hydrocarbyloxy, alkanoyl, alkylsulfonyl and alkylsulfonoyl. The preferred electron-withdrawing group W is halo, e.g., fluoro, chloro, bromo or iodo, particularly the middle halogens chloro and bromo. The R″ group is alkylene of up to 10 carbon atoms inclusive and is illustrated by methylene, 1,3-propylene, 2-methyl-1,3-propylene and 1,4-cyclohexene. The preferred R″ group is methylene and the preferred alkylarylcyclobutene reactants are halomethylbenzocyclobutenes, particularly chloromethylbenzocyclobutene.

The W-alkylarylcyclobutenes are known or are produced by known methods. For example, chloroalkylcyclobutenes are produced by the method of Ewing et al, J. Chem. Soc. Chem. Comm., 207 (1979). The compound 4-chloromethylbenzocyclobutene is produced by alkylation of p-methylbenzyl chloride with formaldehyde in the presence of zinc chloride and hydrogen chloride. The resulting 2,4-di(chloromethyl)toluene is heated at 700° C. in vacuo to give the desired product. Similar reaction of o-methylbenzyl chloride results in production of a 1:2 mixture of 3-chloromethylbenzocyclobutene and 4-chloromethylbenzocyclobutene which mixture is separated by conventional methods or alternatively is employed without separation to produce an isomeric mixture of ethers.

The hydroxyaryl-substituted 1,6-diaza[4.4]spirodilactam moieties of the ether components of the compositions of the invention are derived from a 1,6-diazaspiro[4.4]nonane-2,7-dione which is substituted on each spiro ring nitrogen atom with a hydroxyaryl-containing substituents and is optionally substituted in other spiro ring positions with acyclic or fused ring substituents. One class of such spirodilactams comprises spirodilactams of up to 60 carbon atoms inclusive which are represented by the formula

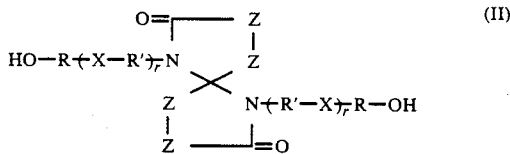

(II)

wherein R independently is aromatic of up to 15 carbon atoms and up to two aromatic rings, inclusive, R′ independently is R or aliphatic of up to 10 carbon atoms inclusive, X independently is a direct valence bond, alkylene of up to 8 carbon atoms inclusive, oxy, thio, sulfonyl, carbonyl, dioxydiphenylene, r independently is 0 or 1, and Z independently is >C(Z′)$_2$ in which Z′ independently is hydrogen, lower alkyl of up to 4 carbon atoms inclusive, preferably methyl, halo, preferably the lower halogens fluoro or chloro, or aryl, preferably phenyl, or Z is such that two adjacent Z groups taken together form a ring system Z″ of from 5 to 7 ring atoms, up to two of which are heteroatoms selected from nitrogen, oxygen or sulfur with the remainder of the ring atoms being carbon atoms, there being up to 15 carbon atoms in each Z″, two of which form a bridge between the carbon atoms connected by the adjacent Z groups. R and R′ independently are hydrocarbyl containing only atoms of carbon and hydrogen or are substituted hydrocarbyl containing additional atoms such as halogen, preferably middle halogen such as chloro or bromo, present as inert monovalent substituents of carbon atoms.

Spirodilactams of a considerable variety of structures are therefore suitably employed as precursors of the ether components of the compositions of the invention. In the embodiment wherein the Z moieties of the above formula II are not part of a fused ring substituent and are therefore acyclic, i.e., each Z is >C(Z′)$_2$, the spirodilactams are illustrated by 1,6-di(4-hydroxyphenyl)-1,6-diazaspiro[4.4]nonane-2,7-dione, 1,6-di(3-hydroxy-4-chlorophenyl)-3,8-dimethyl-1,6-diazaspiro[4.4]nonane-2,7-dione, 1,6-di[4-(3-hydroxybenzoyl)phenyl]-1,6-diazaspiro[4.4]nonane-2,7-dione, 1,6-di(4-hydroxyphenyl)-3,3,4,4,8,8,9,9-octamethyl-1,6-diazaspiro[4.4]nonane-2,7-dione, 1,6-[4-(4′-hydroxybiphenyl)]-3,3-dimethyl-1,6-diazaspiro[4.4]nonane-2,7-dione, 1,6-di[2-(4-hydroxyphenyl)propyl]-1,6-diazaspiro[4.4]nonane-2,7-dione, 1,6-di[4-(4-hydroxyphenylisopropyl)phenyl]-1,6-diazaspiro[4.4]nonane-2,7-dione and 1,6-di(4-hydroxyphenyl)-3,4,8,9-tetrafluoro-1,6-diazaspiro[4.4]nonane-2,7-dione. In the embodiment where adjacent Z moities on each spiro ring form a fused ring substituent, i.e., adjacent Z groups are Z″, illustrative spirodilactams include 1,6-di(4-hydroxyphenyl)-3,4,8,9-dibenzo-1,6-diazaspiro[4.4]nonane-2,7-dione, 1,6-di[4-(4-hydroxyphenyloxy)phenyl]-3,4,8,9-di(pyrido)-1,6-diazaspiro[4.4]nonane-2,7-dione, 1,6-di[4-(4-hydroxyphenyloxy)phenyl]-3,4,8,9-di(pyrido)-1,6-diazaspiro[4.4]nonane-2,7-dione and 1,6-di[4-(4-hydroxyphenylthio)phenyl]-3,4,8,9-di(cyclopentano)-1,6-diazaspiro[4.4]nonane-2,7-dione. Also suitable are those spirodilactams wherein one spiro ring has a fused cyclic substituent and the other spiro ring is free of fused ring substituents, e.g., 1,6-di(4-hydroxyphenyl)-3,4-benzo-8-methyl-1,6-diazaspiro[4.4]nonane-2,7-dione and 1,6-di[1-(4-hydroxynaphthyl)]-3,4-cyclohexano-1,6-diazaspiro[4.4]nonane-2,7-dione.

In general, the hydroxyaryl-substituted spirodilactams of the above formula II are preferred wherein R and R′ are aromatic and hydrocarbon, especially those compounds wherein each r is 0. The class of 1,6-di(hydroxyphenyl) spirodilactams is particularly preferred. Within the spirodilactam portion of the molecule, compounds wherein both spiro rings are free of fused ring substituents are preferred as are the spirodilactams where both spiro rings have a fused ring substituent. The compound 1,6-di(4-hydroxyphenyl)-1,6-diazaspiro[4.4]nonane is an especially preferred member of the former class while 1,6-di(4-hydroxyphenyl)-3,4,8,9-dibenzo-1,6-diazaspiro[4.4]nonane-2,7-dione is an especially preferred member of the latter class.

The hydroxyaryl-substituted spirodilactams of formula II are compounds which are described in more detail and claimed as compositions in copending U.S.

patent application Ser. No. 245,618, filed Sept. 16, 1988. The general method for the production of such spirodilactams is also described and claimed in this copending application and copending U.S. patent applications Ser. No. 172,000, filed Mar. 23, 1988 and Ser. No. 172,052, filed Mar. 23, 1988, now abandoned each of which is incorporated herein by reference.

The ether components of the thermosetting resin compositions are produced by reaction of the W-alkylarylcyclobutene reactant and a salt of the hydroxyaryl-substituted spirodilactam. Although a variety of salts of the hydroxyaryl-substituted spirodilactam are satisfactory, the preferred salts are alkali metal salts and lithium, sodium, potassium, rubidium and cesium salts are suitable. The preferred alkali metal salts are sodium and potassium salts. The alkali metal salt is typically prepared by contacting a solution of the hydroxyaryl-substituted spirodilactam, in a suitable reaction diluent, with a slight stoichiometric excess of a strong alkali metal base, e.g., the hydroxide, carbonate or bicarbonate. The reaction diluent is a polar, inert diluent and in a preferred modification is an N-alkylamide such as N,N-dimethylformamide, N,N-dialkylacetamide or N-methyl-2-pyrrolidone, although other solvent types such as glycols, ethers, ketones, esters, sulfoxides or sulfones may be used. In a particularly convenient embodiment, the diluent employed for the production of the salt is one with which water forms a low-boiling azeotrope or in the alternative a minor quantity of a second diluent is provided, e.g., an alkylated benzene such as toluene or ethylbenzene, with which water azetropes. By either modification the water present or formed during reaction is conveniently removed by azeotropic distillation. Other conventional methods for water removal such as extraction may alternatively be used. The alkali metal salt of the spirodilactam is isolated, if desired, by conventional methods such as solvent removal or precipitation. Isolation of the alkali metal salt is not required, however, and the alkali metal salt may be further reacted in situ to produce the ether.

Reaction of the alkali metal salt of the spirodilactam and the W-alkylarylcyclobutene is accomplished by contacting the two reactants under reaction conditions. In one procedure the arylcyclobutene reactant was present during the preparation of the alkali metal salt and, subsequent to removal of the water present or formed during the preparation of the salt, reaction of the salt with the arylcyclobutene reactant is initiated as by reasing the temperature of the reaction mixture. In another embodiment, the arylcyclobutene reactant is added to a solution of a salt of the hydroxyaryl-substituted spirodilactam in the media of its production or which has been isolated and re-dissolved in the same or a different reaction diluent.

By whatever procedure, the reactants are contacted, preferably in a substantially stoichiometric ratio of about two moles of the arylcyclobutene reactant for each mole of the salt of the spirodilactam. Reactant contact is maintained during reaction by conventional procedures such as shaking or stirring. The reaction temperature is an elevated temperature and temperatures from about 25° C. to about 250° C. are satisfactory. The reaction pressure should be sufficient to maintain the reaction mixture in a liquid phase. Such pressures are generally up to about 20 atmospheres. Subsequent to reaction, the ether product is recovered by well known methods such as precipitation or solvent removal.

The ethers employed as composition components are ethers wherein each hydroxyaryl substituent of the spirodilactam has been etherified through loss of the acidic hydrogen and condensation with the arylcyclobutenealkyl moiety illustratively produced by loss of the electron-withdrawing group of the W-alkylarylcyclobutene reactant. In terms of the reactants as described above, formula I and II, the ether products are represented by the formula

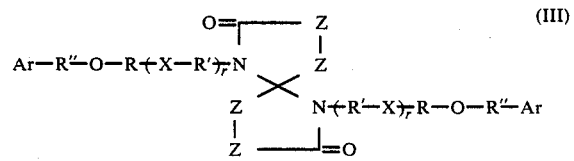

wherein Ar, R, R', R'', r, X and Z have the previously stated meaning. The nomenclature of such ether product is not always easily understood because of the complexity thereof but an illustrative ether product is 1,6-di[4-(4-benzocyclobutenemethyloxy)phenyl]-1,6-diazaspiro[4.4]nonane-2,7-dione illustratively produced by the reaction of 4-chloromethylbenzocyclobutene and the sodium salt of 1,6-di(4-hydroxyphenyl)-1,6-diazaspiro[4.4]nonane-2,7-dione. The identity of other products will be apparent from consideration of the formulas for the reactants and the ether product. These ethers of formula, and the production thereof, are described in greater detail in copending U.S. patent application Ser. No. 324,872, filed Mar. 17, 1989, together with the cured products obtained by heating the ethers in the absence of additional polymerizable monomers.

The thermosetting resin composition of the invention comprise the ethers of the above formula III and at least one additional monomer having at least two substituents with multiple bonds, i.e., more than a single valence bond, between adjacent atoms. Although the precise nature of the interaction between the ether products and the additional polymerizable monomer(s) that takes place during the curing of the resin composition is not known with certainty, it is considered likely that at least in certain circumstances, the cyclobutene portions of the ether component undergo ring opening to form active intermediates which react with the multiple bonds of additional polymerizable monomer, perhaps to form adducts of the Diels-Alder type. By whatever mechanism the reaction takes place, the additional monomers which are useful in the compositions of the invention have substituents within the molecule with multiple bonds between adjacent atoms and at least two of such substituents in order for the crosslinking reaction to take place.

Polymerizable monomers having a variety of substituents are useful in the compositions of the invention and preferably have up to 30 carbon atoms inclusive. The substituents are hydrocarbyl with multiple bonds between adjacent carbon atoms or are non-hydrocarbyl with multiple bonds occurring between two atoms neither of which is carbon. Illustrative of such substituents are hydrocarbyl substituents with multiple bonds occurring between carbon atoms or non-hydrocarbyl substituents with multiple bonds ocurring between one carbon atom and a non-carbon atom or between two atoms neither of which is carbon. Illustrative of such substituents are hydrocarbyl substituents such as allyl, proparyl and styrylmethyl and non-hydrocarbon substituents such as cyanato and maleimido.

The structure of the additional polymerizable monomer to which the substituents are attached is not critical provided that it is inert under the conditions at which the compositions are cured and is not unduly sterically hindered, and a variety of organic linking groups which meet these criteria are suitably found in the additional polymerizable monomers. In the preferred embodiments of the invention, the moieties which link the reactive substituents together are represented by the group L wherein L is the isocyanurate group or the group represented by the formula

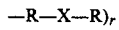  (IV)

wherein R, X and r have the previously stated meaning. The additional polymerizable monomers are therefore represented by the formula L(Sub)$_v$ wherein L has the previously stated meaning, v is an integer of at least 2 and is the valence of the linking group L and Sub represents a substituent having multiple bonds between adjacent atoms. Preferred Sub groups are alkenyl, particularly vinyl or allyl, alkynyl, particularly propargyl, vinylaromaticmethyl, particularly styrylmethyl, cyanato and maleimido. Illustrative of the additional polymerizable monomer are 1,9-decadiene, diallyl ether, di(3-cyanatophenyl)methane, 1,5-di(cyanato)-naphthalene, 1,4-di(maleimido)biphenyl, 1,3-dipropargylbenzene, di(4-maleimidophenyl)sulfone, 1-allyl-4-styrylmethylbenzene, 2,2-di(4-cyanatophenyl)propane, di(4-maleimidophenyl)methane, triallylisocyanurate, 1,3-di(4-cyanatophenyl)propane, 2,2-di(4-hydroxy-3-allylphenyl)propane and divinylbenzene.

The compositions of the invention are the arylcyclobutenealkyl ethers and at least one additional polymerizable monomer. The compositions are usefully the ether plus two or even more additional polymerizable monomers as defined above but preferably the compositions comprise the ether plus from one to two additional polymerizable monomers. The precise proportion of the components in the compositions of the invention is not critical and each component is suitably present in a quantity from about 1% to about 99% by weight based on total composition. In the preferred embodiments of the invention, the arylcyclobutenealkyl ether is present in at least about 50% by weight based on total composition with the additional polymerizable monomers being present in a total of no more than about 50% by weight on the same basis. In even more preferred compositions, the arylcyclobutenealkyl ether is present in about 50% by weight based on total composition, one polymerizable monomer is present in at least about 40% by weight on the same basis with any other additional polymerizable monomer being present as the remainder of the composition.

The compositions of the invention are produced by forming an intimate mixture of the arylcyclobutenealkyl ether and additional polymerizable monomer. The method of mixing is not critical and conventional methods of stirring or blending or co-melting are satisfactory provided that the mixing does not result in sufficient heat or energy to cause the cure or crosslinking of the composition.

The compositions of the invention are cured or crosslinked by application of heat. Curing or crosslinking is usually conducted by heating the composition to a curing temperature of at least about 150° C. and preferably to a temperature from about 175° C. to about 300° C. It is often desirable to effect the curing by heating in two stages. Initially, the composition is maintained at a relatively low curing temperature, e.g., from about 175° C. to about 210° C., for a time sufficient to initiate crosslinking and then maintained at a higher temperature, e.g., from about 215° C. to about 275° C., to complete the cure. The cured products are highly crosslinked solids having relatively high glass transition temperatures and good properties of rigidity, strength and solvent resistance. The compositions are processed by methods which are conventional for the curing of thermosetting resin compositions to produce cured compositions which are useful in adhesive compositions and in coating and structural applications in the aerospace and electronic industries.

The invention is further illustrated by the following Illustrative Embodiments which should not be construed as limiting the invention.

ILLUSTRATIVE EMBODIMENT I

To a 2-liter three-necked round-bottomed flask was charged 16.92 g (0.05 mole) of 1,6-di(4-hydroxyphenyl)-1,6-diazaspiro[4.4]nonane-2,7-dione, 7.6 g (0.055 mole) of potassium carbonate, 50 ml of toluene and 200 ml of N,N-dimethylacetamide. The flask and contents were heated to 150°–160° C. and the water present or formed was removed by azeotropic distillation. When water removal was complete, the temperature was lowered to 80°–90° C. and 16.77 g (0.11 mole) of chloromethylbenzocyclobutene in 50 ml of N,N-dimethylacetamide was added over thirty minutes. The reaction temperature was raised to 150° C. and maintained at that temperature for 12 hours. The resulting mixture was cooled and filtered. The filtrate was concentrated to about 75 ml and slowly poured into 3 liters of water. The precipitated product was recovered by filtration, washed with water and dried in a vacuum oven at 80° C. The dried product had a melting point of 127° C. and the nuclear magnetic spectra of the product were consistent with the structure 1,6-di[4-(4-benzocyclobutenemethyloxy)-phenyl]-1,6-diazaspiro[4.4]nonane-2,7-dione.

ILLUSTRATIVE EMBODIMENT II

A mixture of equal parts by weight of 1,6-di[4-(4-benzocyclobutenemethyloxy)phenyl]-1,6-diazaspiro[4.4]nonane-2,7-dione and di(4-maleimidophenyl)methane was melted together at 130°–150° C. The mixture was then heated in an oven, in a first stage at 200° C. for 2 hours and in a second stage at 220° C. for 4 hours. The resulting mixture, upon cooling, was found to be a highly crosslinked product having a glass transition temperature of 276° C.

ILLUSTRATIVE EMBODIMENT III

The procedure of Illustrative Embodiment II was followed except for initial melting at 100°–120° C., to cure a mixture of equal parts by weight of 1,6-di[4-(4-benzocyclobutenemethyloxy)phenyl]-1,6-diazaspiro[4.4]nonane-2,7-dione and 2,2-di(cyanatophenyl)propane. The cured product had a glass transition temperature of 218° C.

ILLUSTRATIVE EMBODIMENT IV

The procedure of Illustrative Embodiment III was followed to cure a mixture of equal parts by weight of 1,6-di[4(4-benzocyclobutenemethyloxy)phenyl)]-1,6-diazaspiro[4.4]nonane-2,7-dione and triallyl isocyanurate. The resulting cured material had a glass transition temperature of 226° C.

ILLUSTRATIVE EMBODIMENT V

The procedure of Illustrative Embodiment III was followed to cure a mixture of 50 parts by weight of 1,6-di[4-(4-benzocyclobutenemethyloxy)phenyl]-1,6-diazaspiro[4.4]nonane-2,7-dione, 45 parts by weight of 2,2-di(4-cyanatophenyl)propane and 5 parts by weight of di(4-maleimidophenyl)methane. The resulting cured product had a glass transition temperature of 256° C.

What is claimed is:

1. A curable thermosetting resin composition comprising (a) an arylcyclobutenealkyl ether of a 1,6-diaza[4.4]spirodilactam having a hydroxyaryl substituent on each spiro ring nitrogen atom, and (b) at least one additional polymerizable monomer of up to 30 carbon atoms inclusive having at least two functional substituents each of said substituents having multiple bonds between adjacent atoms.

2. The composition of claim 1 wherein the ether is represented by the formula

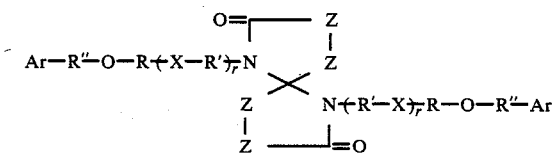

wherein Ar is an aromatic ring system of up to 4 aromatic rings and up to 30 carbon atoms inclusive containing at least one cyclobutene ring fused to an aromatic ring and joined to R" from a carbon atom of an aromatic ring, R" is alkylene of up to 10 carbon atoms inclusive, R is an aromatic system of up to 15 carbon atoms and up to two aromatic rings, inclusive, R' is R or aliphatic of up to 10 carbon atoms inclusive, X is a direct valence bond or X is alkylene of up to 8 carbon atoms inclusive, oxy, thio, sulfonyl, carbonyl, dioxyphenylene, 2,2-di(oxyphenyl)propane, di(oxyphenyl) sulfone and dioxydiphenylene, r is 0 or 1, and Z independently is $>C(Z')_2$ in which Z' is hydrogen, lower alkyl, lower halo or phenyl, or Z is such that two adjacent Z groups form a ring system of from 5 to 7 carbon atoms, up to two of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups.

3. The composition of claim 2 wherein additional polymerizable monomer is represented by the formula L(Sub)$_v$ wherein L is a linking group selected from —R—X—R—$_r$—, wherein R, X and r have the previously stated meanings, or isocyanurate, v is an integer of at least 2 and is the valence of the linking group L, and Sub is a substituent having multiple bonds between adjacent atoms.

4. The composition of claim 3 wherein Sub is selected from alkenyl, alkynyl, vinylaromaticmethyl, cyanato or maleimido.

5. The composition of claim 4 wherein Ar—R"— is benzocyclobutenemethyl.

6. The composition of claim 5 wherein R is phenylene.

7. The composition of claim 6 wherein the ether is present in at least 50% by weight based on total composition and additional polymerizable monomer is present in no more than about 50% by weight based on total composition.

8. The composition of claim 7 wherein, within the ether, each r is 0.

9. The composition of claim 8 wherein Sub is allyl.

10. The composition of claim 8 wherein Sub is cyanato.

11. The composition of claim 8 wherein Sub is maleimido.

12. The composition of claim 8 wherein each Z is $>C(Z')_2$.

13. The composition of claim 12 wherein Z' is hydrogen.

14. The composition of claim 12 wherein, within the ether, R is p-phenylene.

15. The composition of claim 14 wherein Sub is allyl, propargyl, styrylmethyl, cyanato or maleimido.

16. The composition of claim 14 wherein the additional polymerizable monomer is 2,2-bis(4-cyanatophenyl)propane.

17. The composition of claim 14 wherein the additional polymerizable monomer is di(4-maleimidophenyl)methane.

18. The composition of claim 14 wherein the additional polymerizable monomer is triallyl cyanurate.

19. The composition of claim 8 wherein adjacent Z groups are Z".

20. The composition of claim 19 wherein Z" is benzo.

21. The composition of claim 20 wherein, within the ether, R is p-phenylene.

22. The composition of claim 21 wherein Sub is allyl, propargyl, styrylmethyl, cyanato or maleimido.

23. The composition of claim 22 wherein L is —R—X—R)$_r$— in which R is p-phenylene, r is 1 and X is alkylene of up to 8 carbon atoms inclusive.

24. The crosslinked, insoluble composition obtained by heating the composition of claim 1 at a temperature above 150° C.

25. The crosslinked, insoluble composition obtained by heating the composition of claim 15 at a temperature above 150° C.

* * * * *